UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK.

PROCESS OF PRODUCING FERROVANADIUM.

No. 875,208.

Specification of Letters Patent.

Patented Dec. 31, 1907.

Application filed December 29, 1906. Serial No. 350,067.

*To all whom it may concern:*

Be it known that I, EDGAR F. PRICE, a citizen of the United States, residing at Niagara Falls, in the county of Niagara and State of New York, have invented certain new and useful Improvements in Processes of Producing Ferrovanadium, of which the following is a specification.

This invention relates to the production of ferrovanadium low in silicon and containing a moderate percentage of carbon.

I have found that when a charge containing an oxid or oxid ore of vanadium, a source of iron, carbon, preferably in the minimum portion necessary to effect reduction, and a basic flux, if required, is smelted in an electric furnace under suitable conditions, the process of reduction may be carried out continuously, the slag and alloy being tapped out and the charge-mixture supplied as required.

As a specific illustration of the process, I will describe the production of low-silicon ferro-vanadium from a silicious vanadium ore, by an operation comprising two stages. Assuming that the ore to be reduced contains vanadium in the form of a sulfid, it is roasted to convert the vanadium sulfid into vanadium oxid. The roasted product is then mixed with a source of iron, either the oxid or metal, and with carbon, preferably in the minimum proportion required to effect reduction. A basic flux, such as lime, may be added to slag off, as far as practicable, the gangue or acid impurities of the ore. The mixture is then charged into an electric furnace, the electrodes of which are embedded in the charge. This furnace should be provided with a carbon lining, at least at the zone of contact with the slag, and with tap-holes for the slag and alloy. Reduction is then effected and continuously maintained by passing an electric current through the charge, the zone of reduction being surrounded by a considerable body of the charge, to retain the heat and protect the oxidizable electrodes and metallic product from the action of the air. The products are tapped off and the charge-mixture added as required, the slag and alloy being separated either within or outside the furnace. The high-silicon ferro-vanadium is then treated with a suitable reagent to oxidize and remove the contained silicon, preferably with an oxid of either iron or vanadium, so as to introduce no metallic impurities.

I claim:

1. The process of producing ferro-vanadium, which consists in providing a charge containing vanadium oxid, a source of iron and carbon, passing an electric current through the charge, surrounding the zone of reduction and protecting the electrode or electrodes by a considerable body of the charge, and withdrawing the products and supplying the charge-mixture as required.

2. The process of producing ferro-vanadium, which consists in providing a charge containing vanadium oxid, a source of iron and carbon, in the minimum proportion required to effect reduction, passing an electric current through the charge, surrounding the zone of reduction and protecting the electrode or electrodes by a considerable body of the charge, and withdrawing the products and supplying the charge-mixture as required.

3. The process of producing low-silicon ferro-vanadium, which consists in producing a high-silicon ferro-vanadium by electrically smelting a charge containing vanadium oxid, silica, a source of iron and carbon, surrounding the zone of reduction and protecting the electrode or electrodes by a considerable body of the charge, and reacting on the high-silicon product with an oxidizing agent.

4. The process of producing low-silicon ferro-vanadium, which consists in producing a high-silicon ferro-vanadium by electrically smelting a charge containing vanadium oxid, silica, a source of iron and carbon, surrounding the zone of reduction and protecting the electrode or electrodes by a considerable body of the charge, and reacting on the high-silicon product with an oxid of a constituent of ferro-vanadium.

5. The process of producing ferro-vanadium, which consists in treating a vanadium sulfid ore to convert the metal into an oxid, mixing the oxid with a source of iron and carbon, passing an electric current through the charge, surrounding the zone of reduction and protecting the electrode or electrodes by a considerable body of the charge, tapping out the alloy, and supplying the charge-mixture as required.

6. The process of producing ferro-vanadium, which consists in treating a vanadium sulfid ore to convert the metal into an oxid, mixing the oxid with a source of iron, carbon and a basic flux, passing an electric current through the charge, surrounding the zone of reduction and protecting the electrode or electrodes by a considerable body of the charge, tapping out the slag and the alloy, and supplying the charge-mixture as quired.

In testimony whereof, I affix my signatu in presence of two witnesses.

EDGAR F. PRICE.

Witnesses:
FREDK. M. BECKET,
EDW. J. SCHNEIDER.